US012665857B2

(12) United States Patent
Ihlar et al.

(10) Patent No.: US 12,665,857 B2
(45) Date of Patent: Jun. 23, 2026

(54) CONGESTION CONTROL MONITORING

(71) Applicant: Telefonaktiebolaget LM Ericsson (publ), Stockholm (SE)

(72) Inventors: Marcus Ihlar, Älvsjö (SE); Robert Skog, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 20 days.

(21) Appl. No.: 18/709,580

(22) PCT Filed: Nov. 19, 2021

(86) PCT No.: PCT/SE2021/051157
§ 371 (c)(1),
(2) Date: May 13, 2024

(87) PCT Pub. No.: WO2023/091056
PCT Pub. Date: May 25, 2023

(65) Prior Publication Data
US 2025/0030640 A1 Jan. 23, 2025

(51) Int. Cl.
H04L 47/31 (2022.01)
H04L 43/0882 (2022.01)
(Continued)

(52) U.S. Cl.
CPC .......... H04L 47/31 (2013.01); H04L 43/0882 (2013.01); H04L 43/0894 (2013.01); H04L 47/29 (2013.01); H04L 43/16 (2013.01)

(58) Field of Classification Search
CPC ......... H04L 47/29; H04L 43/16; H04L 47/10; H04L 47/11; H04L 47/12; H04L 47/32;
(Continued)

(56) References Cited

U.S. PATENT DOCUMENTS 8,161,145 B2 * 4/2012 Carpenter ........... H04L 63/1458
709/225
8,417,817 B1 * 4/2013 Jacobs .................... H04L 69/28
709/224
(Continued)

FOREIGN PATENT DOCUMENTS

EP 1096737 A2 * 5/2001 ............. H04L 47/10
EP 2028798 A1 * 2/2009 ............. H04L 47/31
(Continued)

OTHER PUBLICATIONS

"Enabling time-critical applications over 5G with rate adaptation", Ericsson—Deutsche Telekom White Paper, BNEW-21:025455 Uen, May 2021, 21 pages.
(Continued)

*Primary Examiner* — Sandarva Khanal
(74) *Attorney, Agent, or Firm* — Murphy, Bilak & Homiller, PLLC

(57) ABSTRACT

In a first aspect, a method of a device configured to monitor congestion for incoming data packets is provided. The method comprises determining whether or not a bit rate of incoming data packets indicated to be sent from a node capable of scalable congestion control exceeds a predetermined bit rate threshold value being lower than a maximum allowable bit rate of outgoing data packets from the device; and if so selectively marking the outgoing data packets as being subjected to congestion, wherein the marking is performed by less frequently marking outgoing data packets having a bit rate closer to the predetermined bit rate threshold value and more frequently marking outgoing data packets having a bit rate closer to the maximum allowable bit rate.

19 Claims, 3 Drawing Sheets

(51) Int. Cl.
　H04L 43/0894　　(2022.01)
　H04L 43/16　　(2022.01)
　H04L 47/10　　(2022.01)

(58) Field of Classification Search
　CPC ......... H04L 47/31; H04L 47/25; H04L 47/22;
　　　　H04L 43/0882; H04L 43/0894; H04L
　　　　47/20; H04L 47/125; H04L 47/127; H04L
　　　　41/5009; H04W 24/04; H04W 28/22;
　　　　H04W 28/02; H04W 28/0284; H04W
　　　　28/0289; H04W 24/02; H04W 24/08;
　　　　H04W 28/10; H04W 28/0247; H04W
　　　　28/0268; H04W 48/06
　See application file for complete search history.

(56)　　　　　　References Cited

U.S. PATENT DOCUMENTS

| | | | | |
|---|---|---|---|---|
| 8,509,074 | B1 | 8/2013 | Roberts et al. | |
| 10,805,225 | B2 * | 10/2020 | Diego Maza | H04L 47/6255 |
| 10,931,710 | B2 * | 2/2021 | Li | H04L 63/1458 |
| 11,855,901 | B1 * | 12/2023 | Kwan | H04L 47/2441 |
| 11,968,129 | B1 * | 4/2024 | Matthews | H04L 47/56 |
| 2003/0103458 | A1 * | 6/2003 | Shin | H04L 69/163 |
| | | | | 370/235 |
| 2004/0218617 | A1 * | 11/2004 | Sagfors | H04L 41/142 |
| | | | | 370/229 |
| 2005/0047340 | A1 | 3/2005 | Babiarz et al. | |
| 2006/0239188 | A1 * | 10/2006 | Weiss | H04L 47/2441 |
| | | | | 370/468 |
| 2007/0070907 | A1 * | 3/2007 | Kumar | H04L 47/326 |
| | | | | 370/235 |
| 2009/0067335 | A1 | 3/2009 | Pelletier et al. | |
| 2012/0092995 | A1 * | 4/2012 | Arvidsson | H04W 28/02 |
| | | | | 370/235 |
| 2012/0163175 | A1 | 6/2012 | Gupta | |
| 2014/0126502 | A1 * | 5/2014 | Westberg | H04W 72/542 |
| | | | | 370/329 |
| 2014/0153387 | A1 * | 6/2014 | Wu | H04L 47/36 |
| | | | | 370/252 |
| 2016/0295265 | A1 * | 10/2016 | Li | H04N 21/64769 |
| 2018/0375775 | A1 * | 12/2018 | Xu | H04W 28/0273 |
| 2019/0089644 | A1 * | 3/2019 | Shpiner | H04L 49/30 |
| 2020/0204460 | A1 | 6/2020 | Schneider et al. | |
| 2021/0328930 | A1 | 10/2021 | Nikolaidis et al. | |
| 2021/0352016 | A1 * | 11/2021 | Navon | H04L 47/62 |

FOREIGN PATENT DOCUMENTS

| | | | | | |
|---|---|---|---|---|---|
| EP | 2637371 | A1 | | 9/2013 | |
| EP | 4020892 | A1 * | | 6/2022 | H04L 47/10 |
| WO | WO-2007047865 | A2 * | | 4/2007 | H04L 47/10 |
| WO | WO-2009008817 | A1 * | | 1/2009 | H04L 47/31 |
| WO | WO-2014074802 | A1 * | | 5/2014 | H04L 47/11 |
| WO | WO-2018150223 | A1 * | | 8/2018 | H04L 12/4625 |
| WO | 2022015757 | A1 | | 1/2022 | |

OTHER PUBLICATIONS

Briscoe, B. , et al., "Low Latency, Low Loss, Scalable Throughput (L4S) Internet Service: Architecture", draft-ietf-tsvwg-l4s-arch-10, Transport Area Working Group, Internet-Draft, Jul. 1, 2021, 42 pages.

Briscoe, B , et al., "Low Latency, Low Loss, Scalable Throughput (L4S) Internet Service: Architecture", draft-ietf-tsvwg-l4s-arch-06, Transport Area Working Group, Internet-Draft, Mar. 9, 2020, 22 pages.

\* cited by examiner

CONGESTION CONTROL MONITORING

TECHNICAL FIELD

The present disclosure relates to a method of monitoring congestion for incoming data packets and a device performing the method.

BACKGROUND

Upon performing so-called traffic policing of data packets in a communications network, a node performing the traffic policing will typically monitor incoming data packets and conclude whether the incoming data packet rate complies with requirements set forth in e.g. a service level agreement (SLA) setup between a subscriber and a network operator.

If the incoming data rate is higher than what is stipulated in the SLA, the policing node applies policing and subjects the incoming data packets to enforcement in that packets are discarded since the incoming data rate is higher than a maximum allowable rate stipulated in the SLA and thus cannot be met by the policing node.

Alternatively, the node may apply traffic shaping to the incoming data packets by buffering the incoming data packets and then forwarding the buffered packets at the lower output data rate stipulated in the SLA.

The benefit of traffic shaping is that fewer packets are discarded as compared to traffic policing, but comes with a cost of increased end-to-end packet latency due to the buffering delay and performance impact at the enforcement node, due to the requirement of maintaining buffers. Further, there is a limit as to how many packets can be buffered before incoming packets must be dropped. Hence, there is thus room for improvement when handling incoming data packets.

SUMMARY

One objective is to solve, or at least mitigate, this problem in the art and to provide an improved method of monitoring congestion for incoming data packets.

This objective is attained in a first aspect by a method of a device configured to monitor congestion for incoming data packets. The method comprises determining whether or not a bit rate of incoming data packets indicated to be sent from a node capable of scalable congestion control exceeds a predetermined bit rate threshold value being lower than a maximum allowable bit rate of outgoing data packets from the device, and if so selectively marking the outgoing data packets as being subjected to congestion, wherein the marking is performed by less frequently marking outgoing data packets having a bit rate closer to the predetermined bit rate threshold value and more frequently marking outgoing data packets having a bit rate closer to the maximum allowable bit rate.

This objective is attained in a second aspect by a device configured to monitor congestion for incoming data packets, said device comprising a processing unit and a memory, said memory containing instructions executable by said processing unit, whereby the device is operative to determine whether or not a bit rate of incoming data packets indicated to be sent from a node capable of scalable congestion control exceeds a predetermined bit rate threshold value being lower than a maximum allowable bit rate of outgoing data packets from the device, and if so selectively marking the outgoing data packets as being subjected to congestion, wherein the marking is performed by less frequently marking outgoing data packets having a bit rate closer to the predetermined bit rate threshold value and more frequently marking outgoing data packets having a bit rate closer to the maximum allowable bit rate.

Advantageously, the predetermined bit rate threshold value is a set as a "safety" threshold value allowing the device to signal in advance that there is a risk of upcoming congestion by marking the outgoing data packets accordingly, where incoming data packets with a bit rate closer to the predetermined bit rate threshold value will be outputted with a congesting marking less often than packets having a bit rate closer to the maximum allowable bit rate.

A node receiving the data packets being output from the device may conclude from the ratio of congestion-marked packets to total number of received data packets a risk of congestion occurring; if few congestion-marked packets are received, the risk of congestion is lower while if many congestion-marked packets are received the risk is higher In an embodiment, the method comprises determining whether or not the bit rate of incoming data packets exceeds a maximum allowable bit rate of outgoing data packets from the device, and if so marking all the outgoing data packets as being subjected to congestion.

In an embodiment, the method comprises computing a measure indicating a frequency with which outgoing data packets are marked as being subjected to congestion; wherein no data packets having a bit rate being equal to or lower than the predetermined bit rate threshold value is marked while all data packets having a bit rate being equal to or higher than a maximum allowable bit rate are marked as being subjected to congestion.

In an embodiment, the frequency with which outgoing data packets are marked as being subjected to congestion increases linearly starting at the predetermined bit rate threshold value and ending at the maximum allowable bit rate.

In an embodiment, the measure being computed as a relation between a difference between the bit rate of the incoming data packet and the predetermined bit rate threshold value and a difference between maximum allowable bit rate of outgoing data packets and the predetermined bit rate threshold value.

In an embodiment, the marking of the outgoing data packets being subjected to congestion is performed by setting an Explicit Congestion Notification (ECN) flag in an outgoing data packet header to "11".

In an embodiment, the device is configured to either discard or buffer incoming data packets should the bit rate of the incoming data packets exceed the maximum allowable bit rate of outgoing data packets from the device.

In a third aspect, a computer program is provided comprising computer-executable instructions for causing a device to perform the method of the first aspect when the computer-executable instructions are executed on a processing unit included in the device.

In a fourth aspect, a computer program product comprising a computer readable medium is provided, the computer readable medium having the computer program of the third aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
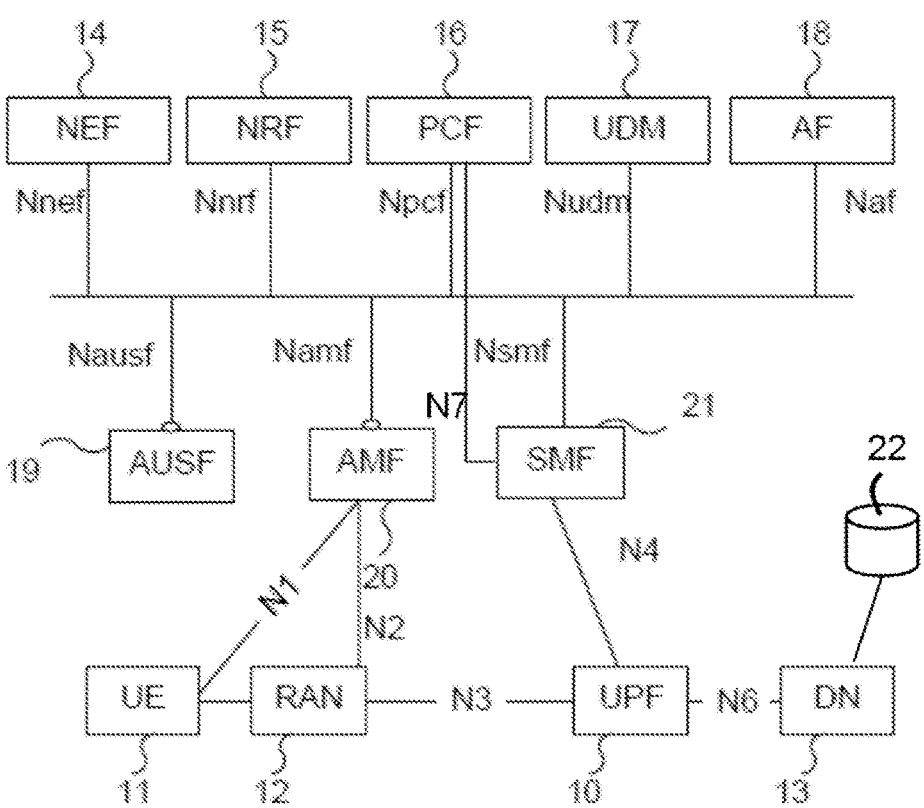
FIG. 1 shows a fifth generation (5G) communication system in which embodiments may be applied.

FIG. 1 illustrates a core network of a fifth generation (5G) communication system-commonly referred to as New Radio (NR)—being connected to a Radio Access Network (RAN) 12 and a wireless communications device 11 referred to as a User Equipment (UE), such as a smart phone, a tablet, a gaming console, a connected vehicle, etc., and further being connected to a data network 13 such as the Internet. Commonly, the core network in a 5G telecommunication system is referred to as 5GC. In an example, the UE 11 may be embodied in the form of a tablet communicating with a gaming server 22 hosting computer games to be accessed by a user of the tablet.

The 5GC comprises a number of entities referred to as Network Functions (NFs) which will be described in the following. A User Plane Function (UPF) 10 is a service function that processes user plane packets; processing may include altering the packet's payload and/or header, interconnection to data network(s), packet routing and forwarding, etc. The UPF 10 may in practice be decomposed into many small UPFs referred to as µUPFs. Embodiments may be implemented in such a UPF 10 as subsequently will be discussed.

Further, the 5GC comprises a Network Exposure Function (NEF) 14 for exposing capabilities and events, an NF (Network Function) Repository Function (NRF) 15 for providing discovery and registration functionality for NFs, a Policy Control Function (PCF) 16, Unified Data Management (UDM) 17 for storing subscriber data and profiles, and an Application Function (AF) 18 for supporting application influence on traffic routing.

Moreover, the 5GC comprises an Authentication Server Function (AUSF) 19 storing data for authentication of the UE 11, an Access and Mobility Function (AMF) 20 for providing UE-based authentication, authorization, mobility management, etc., and a Session Management Function (SMF) 21 configured to perform session management, e.g. session establishment, modify and release, etc.

If implemented in a third generation (3G) communication system, commonly referred to as Universal Mobile Telecommunications System (UMTS) embodiments would typically be implemented in a so-called Gateway GPRS ("General Packet Radio Service") Support Node (GGSN), while the functionality of the PCF would be performed by a Home Location Register (HLR).

If implemented in a fourth generation (4G) communication system, commonly referred to as Long Term Evolution (LTE), embodiments would typically be implemented in a Packet Data Network Gateway (PGW) while the functionality of the PCF would be performed by a Policy and Charging Rules Function (PCRF).

Now, for data packets transmitted in the data plane from the UE 11 over the RAN 12 to the UPF 10 and further to the data network 13 (or in the opposite direction) for reception at the gaming server 22, a data rate for the packets may be controlled by the UPF 10. This is commonly referred to as traffic policing. The UPF 10 when performing traffic policing monitors incoming data packets and concludes whether the incoming data packet rate complies with requirements set forth in e.g. a service level agreement (SLA) setup between a subscriber/user of the UE and a network operator.

Such information is typically supplied to the UPF 10 by the PCF 16 over interface N7 to the SMF 21 and further over interface N4.

If the incoming data rate is higher than what is stipulated in the SLA, the UPF 10 applies policing and subjects the incoming data packets to enforcement in that packets are discarded since the incoming data rate is higher than a maximum allowable rate stipulated in the SLA and thus cannot be met by the UPF 10.

Policing may be enforced using a so-called token bucket algorithm envisaging a virtual bucket filled with n tokens stipulating capacity. Whenever a data packet of n bytes arrives, it will be transmitted if there are at least n tokens left in the bucket or dropped if there are less than n tokens left.

Alternatively, the UPF 10 may apply traffic shaping to the incoming data packets by buffering the incoming data packets and then forwarding the buffered packets at the lower output data rate stipulated in the SLA. The benefit of traffic shaping is that fewer packets are dropped as compared to traffic policing, but comes with a cost of increased end-to-end packet latency due to the buffering delay and performance impact at the enforcement node, due to the requirement of maintaining buffers. Further, there is a limit as to how many packets can be buffered before incoming packets must be dropped.

Explicit Congestion Notification (ECN) is an extension to the Internet Protocol (IP) and to the Transmission Control Protocol (TCP) allowing the UPF 10 performing traffic shaping to mark any outgoing data packets—in practice performed by setting an ECN flag in the IP header—to indicate congestion occurring at the UPF 10.

A receiver of the marked packets being output from the UPF 10, i.e. in this example the gaming server 22 in the data network 13, informs the sending UE 11 of the congestion indication provided by the marked data packet, wherein the UE 10 reduces its transmission rate in order to avoid data packet drop or buffering at the UPF 10. The marking approach is commonly referred to as Active Queue Management (AQM).

A slightly more advanced approach to congestion control is an approach referred to as Low Latency Low Loss Scalable Throughput (LAS). LAS is a queueing mechanism designed to reduce queueing latency for Internet traffic. An LAS enabled node, such as the UPF 10, will determine size of its buffering queue and signal congestion by setting a flag when a predetermined queue size threshold is exceeded, thereby indicating that the UPF 10 will reach a buffering limit within short and thus have to drop packets unless the incoming data rate decreases.

This allows for more fine-grained control of both throughput and queueing delay than classic congestion controllers. L4S repurposes the ECN flags, or codepoints, as illustrated in Table 1 below such that ECT(1) is used to signal LAS support and ECT(0) is used to signal conventional ECN support.

TABLE 1

L4S header format.

| Flag | Name | Meaning |
|------|---------|-----------------------------|
| 00 | Non-ECT | Not ECN-capable transport |
| 01 | ECT (1) | L4S-capable transport |
| 10 | ECT (0) | ECN-capable transport |
| 11 | CE | Congestion experienced |

To conclude, current traffic policing functions cap flows to a specific bitrate using some form of token bucket algorithm, where packets are dropped when the incoming rate exceeds the maximum allowed output bitrate. Hence, dropped packets will have to be retransmitted causing application layer jitter. Further, a high degree of packet loss may create situations where the sending-side congestion controller reduces its sending rate more than necessary.

Traffic shapers buffer data packets instead of dropping the packets, which resolve the problem of data packet retransmissions (until the buffering capacity is reached). However, this leads to large-end-to-end delays and requires a high memory capacity in the policing node.

Figure 2:
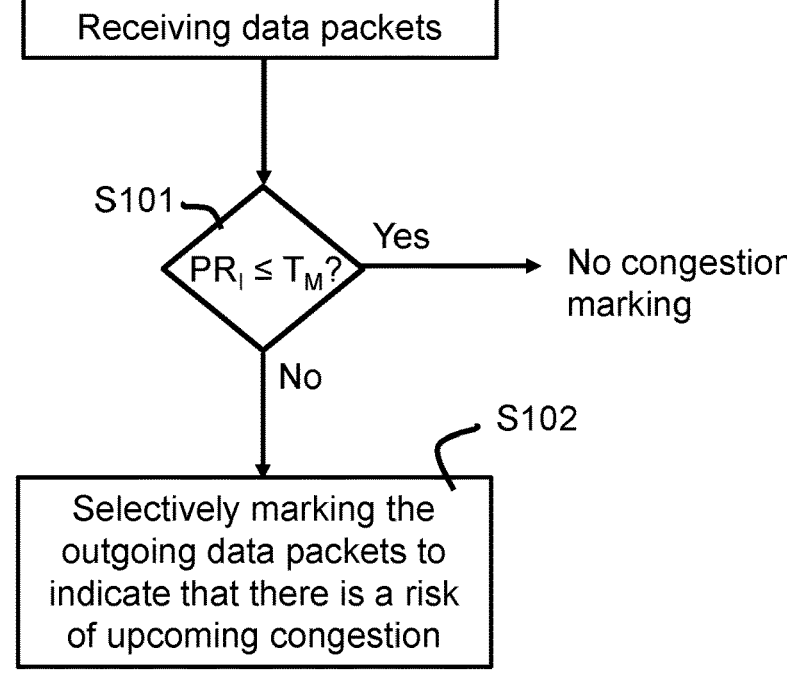
FIG. 2 shows a flowchart illustrating a method of a device configured to control bit rate of incoming data packets according to an embodiment.

FIG. 2 shows a flowchart illustrating a method of a device configured to monitor congestion for incoming data packets according to an embodiment.

The device in which the method is performed is in this embodiment is exemplified to be the UPF 10.

In a first step S101, upon receiving data packets from a node being capable of scalable congestion control, in this exemplifying embodiment the UE 11, the UPF 10 determines whether or not a bit rate PRI of the received incoming data packets exceeds a predetermined bit rate threshold value $T_M$.

If not, the UPF 10 will conclude that there is no immediate risk of congestion and no congestion marking will be performed.

In this example, $T_M$=8 Mbit/s and a further condition of the predetermined bit rate threshold value $T_M$ is that it is lower than a maximum allowable bit rate $T_O$ of outgoing data packets from the UPF 10. The maximum allowable bit rate $T_O$ is typically stipulated in the previously discussed SLA managed by the PCF 16. The user of the UE 11 thus holds a subscription allowing the user a maximum bit rate $T_O$ in the network.

In practice, $T_M$ and $T_O$ may be included in information specifying a Policy and Charging Control (PCC) rule sent by the PCF 16 to the SMF 21 over the N7 interface. The SMF 21 may translate the PCC rule to a modified QoS ("Quality of Service") Enhancement Rule (QER) comprising the information, in addition to comprising information specifying that ECN is to be applied.

A UPF in 5GC will apply traffic policing to flows of packets that are matched by packet detection information (PDI) and has a corresponding QER. PDI outlines key filter elements that should be applied in order to detect a specific packet e.g. IP address, port information, etc. If a modified QER has been received for a flow that matches the PDI and that flow is advertising ECN capability with the ECT(1) flag set, the QER indicates that L4S policing will be performed.

In this example, $T_O$=10 Mbit/s indicating that the maximum data rate $PR_O$ with which the UPF 10 will output data packets pertaining to this particular subscription upon enforcing policing is 10 Mbit/s.

However, if the rate $PR_I$ of the incoming packets exceeds the predetermined bit rate threshold value $T_M$, the UPF 10 will conclude that there is an upcoming risk of congestion should the bit rate of the incoming data packets further increase and a congestion marking will selectively be performed in step S102 by setting the flag of Table 1 to 11, thereby indicating congestion (CE, "congestion experienced").

In other words, the UPF 10 performs a selective marking in step S102 of the outgoing data packets indicating that there is a risk of upcoming congestion for incoming data packets, wherein the marking is performed by less frequently marking outgoing data packets having a bit rate closer to the predetermined bit rate threshold value $T_M$ and more frequently marking outgoing data packets having a bit rate closer to the maximum allowable bit rate $T_O$.

Advantageously, with this embodiment, a safety threshold $T_M$ is set allowing the UPF 10 to signal in advance that there is a risk of upcoming congestion by marking the outgoing data packets accordingly. This is communicated by setting the ECN flag to "11" in the header of the outgoing data packets to the gaming server 22, whereby the gaming server 22 subsequently informs the original sending node, i.e. the UE 11, that there is a risk of congestion at if the UE 11 was to increase the bit rate $PR_I$ of transmitted data packets.

Advantageously, the gaming server 22 may conclude by the ratio of CE-marked packets (having ECN flag set to "11") to total number of received data packets what risk of congestion occurring.

Figure 3:
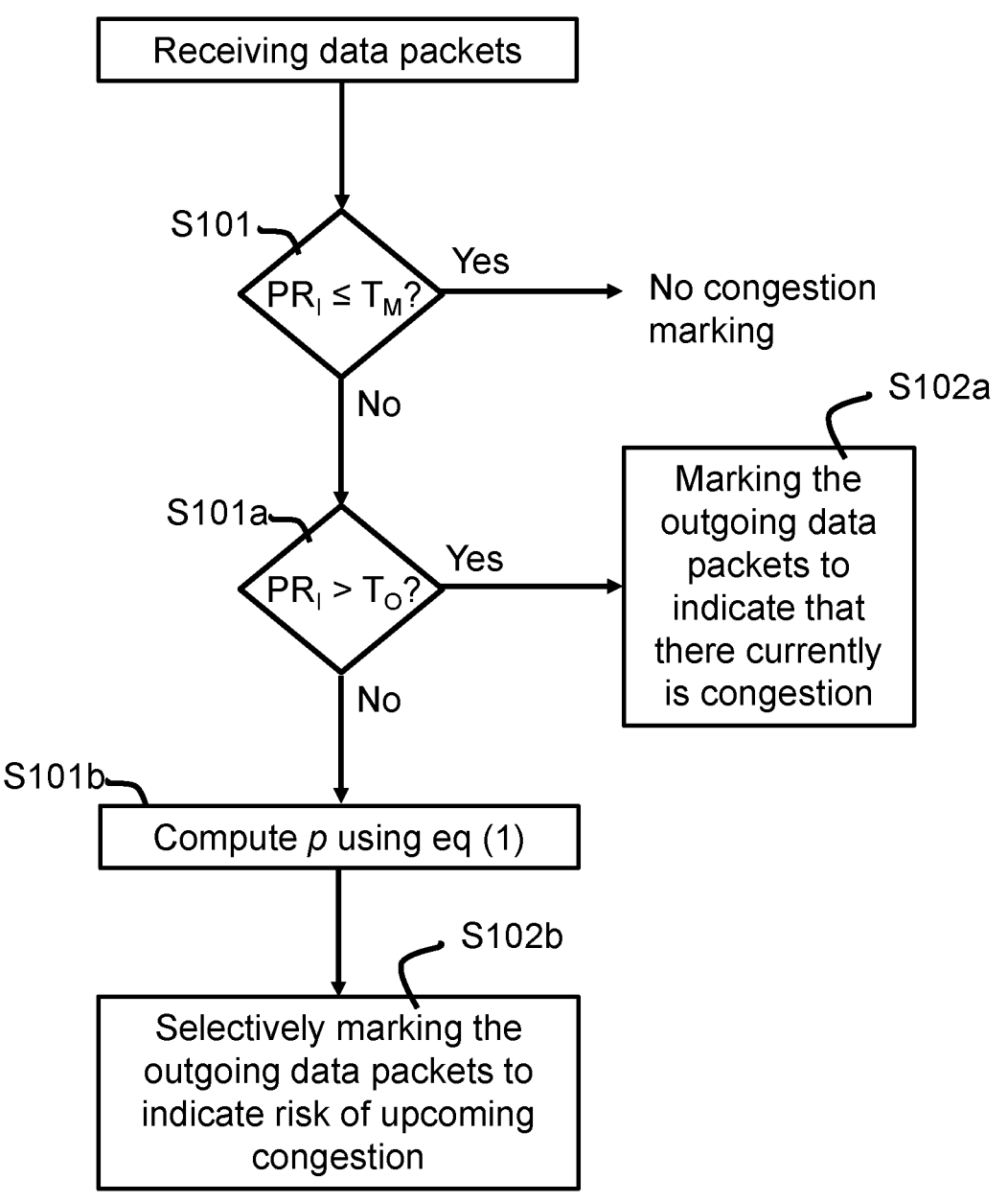
FIG. 3 shows a flowchart illustrating a method of a device configured to control bit rate of incoming data packets according to a further embodiment.

FIG. 3 shows a flowchart illustrating a further embodiment. Thus, after having determined that the bit rate $PR_I$ of the incoming data packets exceeds the predetermined bit rate threshold value $T_M$, the UPF 10 performs a computation of a measure p indicating a frequency with which outgoing data packets are marked as being subjected to congestion (thereby also indicating the risk of upcoming congestion) as described in the following.

$$p = \begin{cases} 0, & PR_I \leq T_M \\ \dfrac{PR_I - T_M}{T_O - M}, & T_M < PR_I \leq T_O \\ 1, & PR_I > T_O \end{cases} \quad (1)$$

Hence, if the bit rate $PR_I$ of incoming packets is determined in step S101 to not exceed the predetermined bit rate threshold value $T_M$—i.e. the safety threshold-none of the outgoing data packets will be marked as congested. This will be indicated to the main server 22 that there currently is no risk of congestion (or at least a low risk).

At the other end of the spectrum, if the bit rate $PR_I$ of incoming data packets is determined in step S101a to exceed the maximum allowable bit rate $T_O$ for outgoing data packets, all the outgoing data packets will be CE-marked in step S102a indicating that there indeed is congestion, even at the current bit rate $PR_I$ for the incoming data packets. The gaming server 22 will thus conclude that there currently is congestion in that all received data packet are marked to have an ECN flag of "11".

As can be seen in equation (1) computed in step S101b for incoming data packets $T_M<PR_I\leq T_O$, a measure p indicating a frequency with which outgoing data packets are marked as being subjected to congestion is computed.

Figure 4:
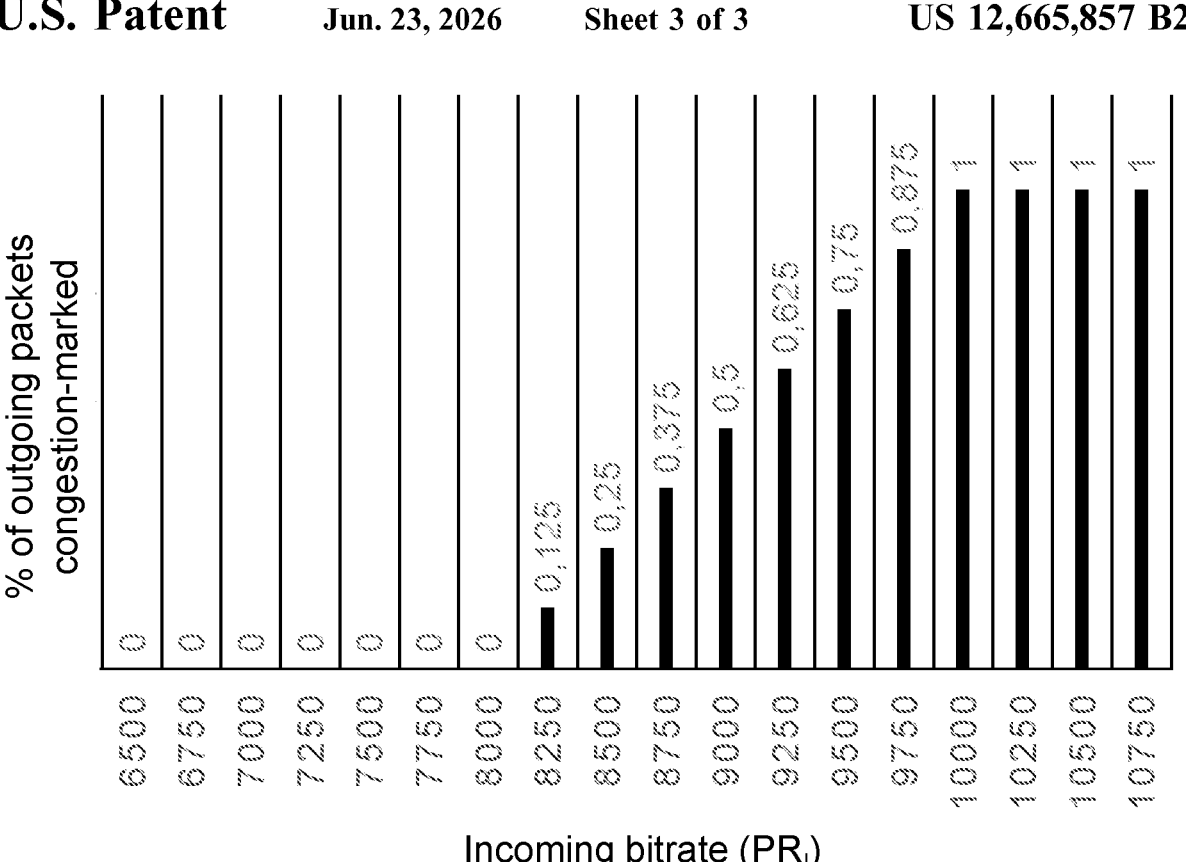
FIG. 4 illustrates a computed measure indicating risk of congestion according to an embodiment.

FIG. 4 illustrates the risk of upcoming congestion by the UPF 10 using equation (1) to compute measure p indicating the risk given that $T_M=8$ Mbit/s and $T_O=10$ Mbit/s.

As can be seen, up until the incoming bitrate $PR_I$ does not exceed the safety threshold $T_M=8$ Mbit/s, there is no immediate risk of upcoming congestion and no congestion marking will be undertaken by the UPF 10 of outgoing packets. The flag of Table 1 would thus be set to either 01 or 10 depending on whether or not the UE 11 is L4S capable.

For any incoming bitrate $PR_I$ exceeding the safety threshold $T_M=8$ Mbit/s, the measure p is computed according to equation (1) where for $PR_I=8.25$ Mbit/s, p=0.125, for $PR_I=9$ Mbit/s, p=0.5, and for $PR_I=9.75$ Mbit/s, p=0.875, and so on until $PR_I$ reaches the maximum value $T_O$ at which there is a 100% marking frequency of outgoing data packets at the UPF 10. In fact, for any $PR_I$ exceeding the maximum threshold value $T_O$, there is indeed already congestion as stipulated by $T_O$.

With the example hereinabove, 12.5% of the incoming packets having $PR_I=8.25$ Mbit/s will be CE-marked upon being outputted from the UPF 10, 50% of the incoming packets having $PR_I=9$ Mbit/s will be CE-marked upon being outputted, and so on.

Thus, with reference to FIG. 4, the gaming server 22 receiving the data packets being outputted from the UPF 10 may conclude that the computed measure p, as reflected at the gaming server 22 by the ratio of CE-marked packets to non-CE-marked packets, indicates with which degree the incoming bit rate can increased before congestion indeed occurs; the lower the ratio, the higher the possible increase.

As is understood, if $PR_I>T_O$, the UPF 10 may either perform policing thus dropping the incoming packets, or perform shaping thereby buffering the incoming packets, or a combination of both (i.e. dropping some packets while queuing others).

Incoming data packets that do not indicate support for scalable congestion control (i.e. marked "00" as illustrated in Table 1) can coexist with scalable flows in the policing function provided by the UPF 10 in that packets belonging to non-scalable flows is not marked by the UPF 10. If scalable and non-scalable traffic are passing through the policing function of the UPF 10 in parallel, the packets belonging to the scalable flows will be marked based on the incoming packet bitrate of a combined set of data packet flows.

Figure 5:
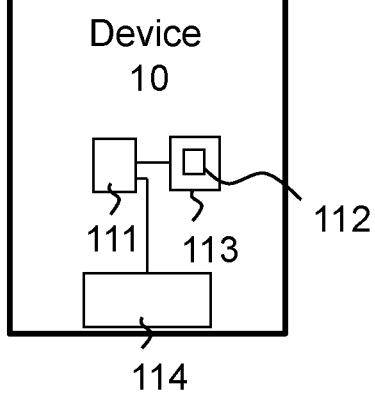
FIG. 5 illustrates a device configured to control bit rate of incoming data packets according to an embodiment.

FIG. 5 illustrates a device 10 such as e.g. a UPF configured to monitor congestion for incoming data packets according to an embodiment, where the steps of the method performed by the device 10 in practice are performed by a processing unit 111 embodied in the form of one or more microprocessors arranged to execute a computer program 112 downloaded to a storage medium 113 associated with the microprocessor, such as a Random Access Memory (RAM), a Flash memory or a hard disk drive. The processing unit 111 is arranged to cause the device 10 to carry out the method according to embodiments when the appropriate computer program 112 comprising computer-executable instructions is downloaded to the storage medium 113 and executed by the processing unit 111. The storage medium 113 may also be a computer program product comprising the computer program 112. Alternatively, the computer program 112 may be transferred to the storage medium 113 by means of a suitable computer program product, such as a Digital Versatile Disc (DVD) or a memory stick. As a further alternative, the computer program 112 may be downloaded to the storage medium 113 over a network. The processing unit 111 may alternatively be embodied in the form of a digital signal processor (DSP), an application specific integrated circuit (ASIC), a field-programmable gate array (FPGA), a complex programmable logic device (CPLD), etc. The device 10 further comprises a communication interface 114 (wired or wireless) over which it is configured to transmit and receive data.

The device 10 of FIG. 5 may be provided as a standalone device or as a part of at least one further device. For example, the device 10 may be provided in a node of a core network, or in an appropriate device of a radio access network (RAN), such as in a radio base station. Alternatively, functionality of the device 10 may be distributed between at least two devices, or nodes. These at least two nodes, or devices, may either be part of the same network part (such as the core network) or may be spread between at least two such network parts.

Thus, a first portion of the instructions performed by the device 10 may be executed in a first device, and a second portion of the of the instructions performed by the device 10 may be executed in a second device; the herein disclosed embodiments are not limited to any particular number of devices on which the instructions performed by the device 10 may be executed.

Hence, the method according to the herein disclosed embodiments are suitable to be performed by a device 10 residing in a cloud computational environment. Therefore, although a single processing circuitry 111 is illustrated in FIG. 5, the processing circuitry 111 may be distributed among a plurality of devices, or nodes. The same applies to the computer program 112. Embodiments may be entirely implemented in a virtualized environment.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of operation by a device configured for operation in a communication network, the method comprising:

transmitting outgoing data packets corresponding to incoming data packets of a packet flow originating from a node that is capable of scalable congestion control;

determining whether or not a bit rate of the incoming data packets exceeds a predetermined bit rate threshold value that is lower than a maximum allowable bit rate applicable to the packet flow; and responsive to the bit rate of the incoming data packets exceeding the predetermined bit rate threshold value, applying congestion marking to a fraction of the outgoing data packets, and determining the fraction based on an extent to which the bit rate of the incoming data packets exceeds the predetermined bit rate threshold value.

2. The method of claim 1, wherein the fraction becomes one-hundred percent upon the bit rate reaching the maximum allowable bit rate.

3. The method of claim 2, wherein, for a bit rate range going from the predetermined bit rate threshold value to the maximum allowable bit rate, the fraction increases linearly from zero percent to one-hundred percent.

4. The method of claim 2, wherein the fraction is computed based on the difference between the bit rate of the incoming data packets and the predetermined bit rate threshold value.

5. The method of claim 1, further comprising determining that the node is capable of scalable congestion control based on an indication included in the incoming data packets.

6. The method of claim 1, wherein the scalable congestion control comprises Low Latency Low Loss Scalable Throughput (L4S).

7. The method of claim 1, wherein applying the congestion marking comprises, for each outgoing data packet marked, setting an Explicit Congestion Notification (ECN) flag in an outgoing data packet header to "11".

8. The method of claim 1, wherein the device is one of a User Plane Function (UPF) being configured to receive the predetermined bit rate threshold value and the maximum allowable bit rate from a Policy Control Function (PCF), a Gateway General Packet Radio Service Support Node (GGSN) being configured to receive the predetermined bit rate threshold value and the maximum allowable bit rate from a Home Location Register (HLR), and a Packet Data Network Gateway (PGW) being configured to receive the predetermined bit rate threshold value and the maximum allowable bit rate from a Policy and Charging Rules Function (PCRF).

9. The method of claim 1, further comprising limiting a bit rate of the outgoing data packets to the maximum allowable bit rate by either discarding or buffering at least some of the incoming data packets.

10. A non-transitory computer readable medium storing computer program instructions that, when executed by a processor of a device in a communication network, configure the device to:

transmit outgoing data packets corresponding to incoming data packets of a packet flow originating from a node that is capable of scalable congestion control;

determine whether or not a bit rate of the incoming data packets exceeds a predetermined bit rate threshold value that is lower than a maximum allowable bit rate applicable to the packet flow; and responsive to the bit rate of the incoming data packets exceeding the predetermined bit rate threshold value, apply congestion marking to a fraction of the outgoing data packets, and determine the fraction based on an extent to which the bit rate of the incoming data packets exceeds the predetermined bit rate threshold values.

11. A device comprising:

a memory storing instructions; and a processor to execute the instructions, whereby the processor controls the device to:

transmit outgoing data packets corresponding to incoming data packets of a packet flow originating from a node that is capable of scalable congestion control;

determine whether or not a bit rate of the incoming data packets exceeds a predetermined bit rate threshold value that is lower than a maximum allowable bit rate applicable to the packet flow; and responsive to the bit rate of the incoming data packets exceeding the predetermined bit rate threshold value, apply congestion marking to a fraction of the outgoing data packets, and determine the fraction based on an extent to which the bit rate of the incoming data packets exceeds the predetermined bit rate threshold value.

12. The device of claim 11, wherein the fraction becomes one-hundred percent upon the bit rate reaching the maximum allowable bit rate.

13. The device of claim 11, wherein the processor further controls the device to determine that the node is capable of scalable congestion control based on an indication included in the incoming data packets.

14. The device of claim 11, wherein, for a bit rate range going from the predetermined bit rate threshold value to the maximum allowable bit rate, the fraction increases linearly from zero percent to one-hundred percent.

15. The device of claim 11, wherein the fraction is computed based on the difference between the bit rate of the incoming data packets and the predetermined bit rate threshold value.

16. The device of claim 11, wherein the scalable congestion control comprises Low Latency Low Loss Scalable Throughput (LAS).

17. The device of claim 11, the device applies the congestion marking by setting an Explicit Congestion Notification (ECN) flag in an outgoing data packet header to "11".

18. The device of claim 11, wherein the device is one of a User Plane Function (UPF) being configured to receive the predetermined bit rate threshold value and the maximum allowable bit rate from a Policy Control Function (PCF), a Gateway General Packet Radio Service Support Node (GGSN) being configured to receive the predetermined bit rate threshold value (TM) and the maximum allowable bit rate from a Home Location Register (HLR), and a Packet Data Network Gateway (PGW) being configured to receive the predetermined bit rate threshold value and the maximum allowable bit rate from a Policy and Charging Rules Function (PCRF).

19. The device of claim 11, wherein the device is controlled to limit the bit rate of the outgoing data packets to the maximum allowable bit rate by discarding or buffering at least some of the incoming data packets.

* * * * *